(12) United States Patent
Yokote

(10) Patent No.: US 8,208,246 B2
(45) Date of Patent: Jun. 26, 2012

(54) ELECTRONIC APPARATUS

(75) Inventor: Satoshi Yokote, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 223 days.

(21) Appl. No.: 12/636,567

(22) Filed: Dec. 11, 2009

(65) Prior Publication Data
US 2010/0238616 A1 Sep. 23, 2010

(30) Foreign Application Priority Data

Mar. 19, 2009 (JP) ................................ 2009-068661

(51) Int. Cl.
*G06F 1/16* (2006.01)
(52) U.S. Cl. .................... 361/679.02; 345/647; 455/349; 248/316.8; 349/155
(58) Field of Classification Search .................. 345/173, 345/157, 174, 184, 179, 214, 175, 156, 1.1, 345/647, 207, 684; 361/679.01, 679.02, 361/679.55, 679.27, 679.06, 679.23, 679.26, 361/679.07, 679.21, 679.22; 455/575.4, 455/550.1, 90.1, 349; 248/158, 176.3, 122.1, 248/121, 220.21, 292.11, 316.8; 349/96, 349/58, 59, 155, 10, 12
See application file for complete search history.

(56) References Cited

U.S. PATENT DOCUMENTS

| | | |
|---|---|---|
| 2005/0200737 A1 | 9/2005 | Shinohara et al. |
| 2007/0065091 A1 | 3/2007 | Hinata et al. |
| 2007/0285878 A1 | 12/2007 | Konno et al. |
| 2008/0021268 A1* | 1/2008 | Shoroji et al. ................. 600/101 |
| 2009/0168314 A1* | 7/2009 | Park et al. ................. 361/679.02 |
| 2009/0225239 A1* | 9/2009 | Osada et al. .................. 348/841 |
| 2010/0259891 A1* | 10/2010 | Tachikawa ............... 361/679.55 |
| 2011/0102343 A1* | 5/2011 | Imai et al. ...................... 345/173 |

FOREIGN PATENT DOCUMENTS

| | | |
|---|---|---|
| JP | 2-062471 | 5/1990 |
| JP | 10-145056 | 5/1998 |
| JP | 11-074661 | 3/1999 |
| JP | 11-142818 | 5/1999 |
| JP | 2002-196838 | 7/2002 |
| JP | 2003-131788 | 5/2003 |

(Continued)

OTHER PUBLICATIONS

Japanese Patent Application No. 2010-095741, Notification of Reasons for Refusal, mailed Apr. 10, 2012, (with English Translation).

*Primary Examiner* — Hung Duong
(74) *Attorney, Agent, or Firm* — Blakely, Sokoloff, Taylor & Zafman LLP

(57) ABSTRACT

According to an aspect of the present invention, there is provided an electronic apparatus including: a display device including a display screen; a housing that accommodates the display device and that includes a first opening portion facing a central portion of the display screen and a second opening portion facing a circumferential edge portion of the display screen; a support portion that supports the housing so as to be rotatable between an opened position where the display screen is exposed and a closed position where the display screen is hidden; and an elastic member that is packed between the circumferential edge portion of the display screen and the housing and that protrudes from the housing through the second opening portion so as to abut on the support portion located when the hosing is in the closed position.

10 Claims, 12 Drawing Sheets

FOREIGN PATENT DOCUMENTS

| | | |
|---|---|---|
| JP | 2003-163727 | 6/2003 |
| JP | 2004-151610 | 5/2004 |
| JP | 2005-234143 | 9/2005 |
| JP | 2007-114737 | 5/2007 |
| JP | 2007-156551 | 6/2007 |
| JP | 2007-328613 | 12/2007 |
| JP | 2008-009010 | 1/2008 |
| JP | 2008-294829 | 4/2008 |

* cited by examiner

ELECTRONIC APPARATUS

CROSS-REFERENCE TO RELATED APPLICATIONS

This application is based upon and claims the benefit of priority from Japanese Patent Application No. 2009-068661, filed on Mar. 19, 2009, the entire contents of which are incorporated herein by reference.

BACKGROUND

1. Field

An aspect of the present invention relates to an electronic apparatus having a display device.

2. Description of the Related Art

An electronic apparatus having a body housing and a display unit housing rotatable relative to the body housing has been disclosed. The electronic apparatus has the body housing provided with a keyboard mount portion, the display unit housing provided with a built-in display device or the like, and a fixing member provided so as to protrude from the display unit housing. The display unit housing further has an opening portion in which the fixing member is embedded. The fixing member is an elastic member such as rubber. The fixing member is provided so as to protrude from a corner portion of the display unit housing toward the body housing.

When the display unit housing is closed, the fixing member abuts on an upper surface of the body housing to thereby absorb shock generated in the display unit housing.

However, the background art does not give any consideration to stress transmitted to the display device. For example, in the apparatus described in JP-2007-156551-A, there is a possibility that external stress will be directly transmitted from the display unit housing to the display device to destroy a circumferential edge portion of the display device because the display unit housing and the display device abut on each other.

BRIEF DESCRIPTION OF THE SEVERAL VIEWS OF THE DRAWINGS

A general architecture that implements the various feature of the present invention will now be described with reference to the drawings. The drawings and the associated descriptions are provided to illustrate embodiments of the present invention and not to limit the scope of the present invention.

DETAILED DESCRIPTION

Various embodiments according to the present invention will be described hereinafter with reference to the accompanying drawings. In general, according to one embodiment of the present invention, there is provided an electronic apparatus including: a display device including a display screen; a housing that accommodates the display device and that includes a first opening portion facing a central portion of the display screen and a second opening portion facing a circumferential edge portion of the display screen; a support portion that supports the housing so as to be rotatable between an opened position where the display screen is exposed and a closed position where the display screen is hidden; and an elastic member that is packed between the circumferential edge portion of the display screen and the housing and that protrudes from the housing through the second opening portion so as to abut on the support portion located when the hosing is in the closed position.

Embodiments of the invention will be described below with reference to the drawings in which the invention is applied to a portable computer.

Figure 1:
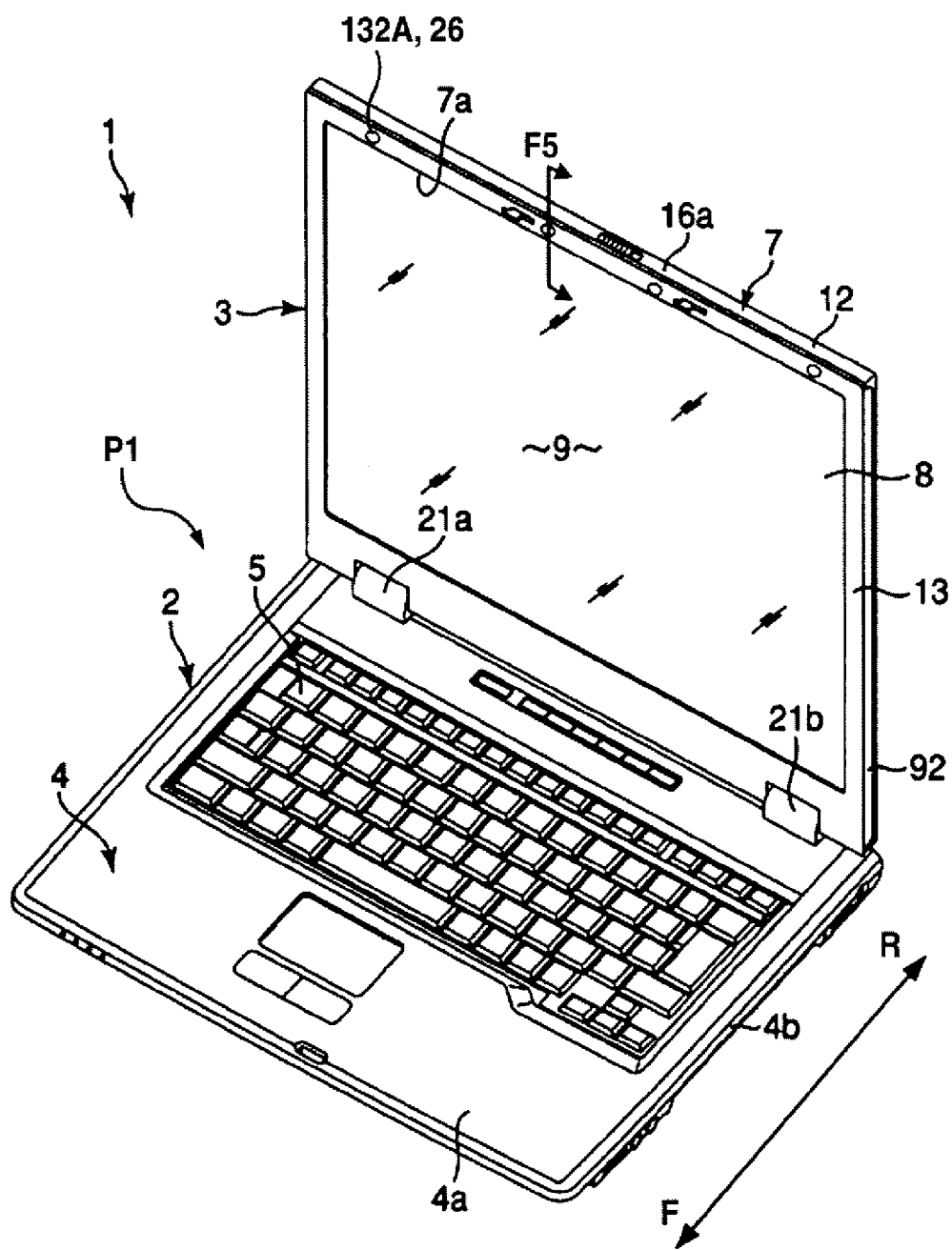
FIG. 1 is an exemplary perspective view of a portable computer according to a first embodiment of the invention.

FIG. 1 discloses a portable computer 1 as an electronic apparatus according to a first embodiment of the invention. As shown in FIG. 1, the portable computer 1 has a body 2, and a display unit 3. In this specification, a side near a user is defined as 'frontward' F, a side far from the user is defined as 'rearward' R, a left side in user's view is defined as 'leftward', a right side in user's view is defined as 'rightward', an upper side in user's view is defined as 'upward', and a lower side in user's view is defined as 'downward'.

Figure 7:
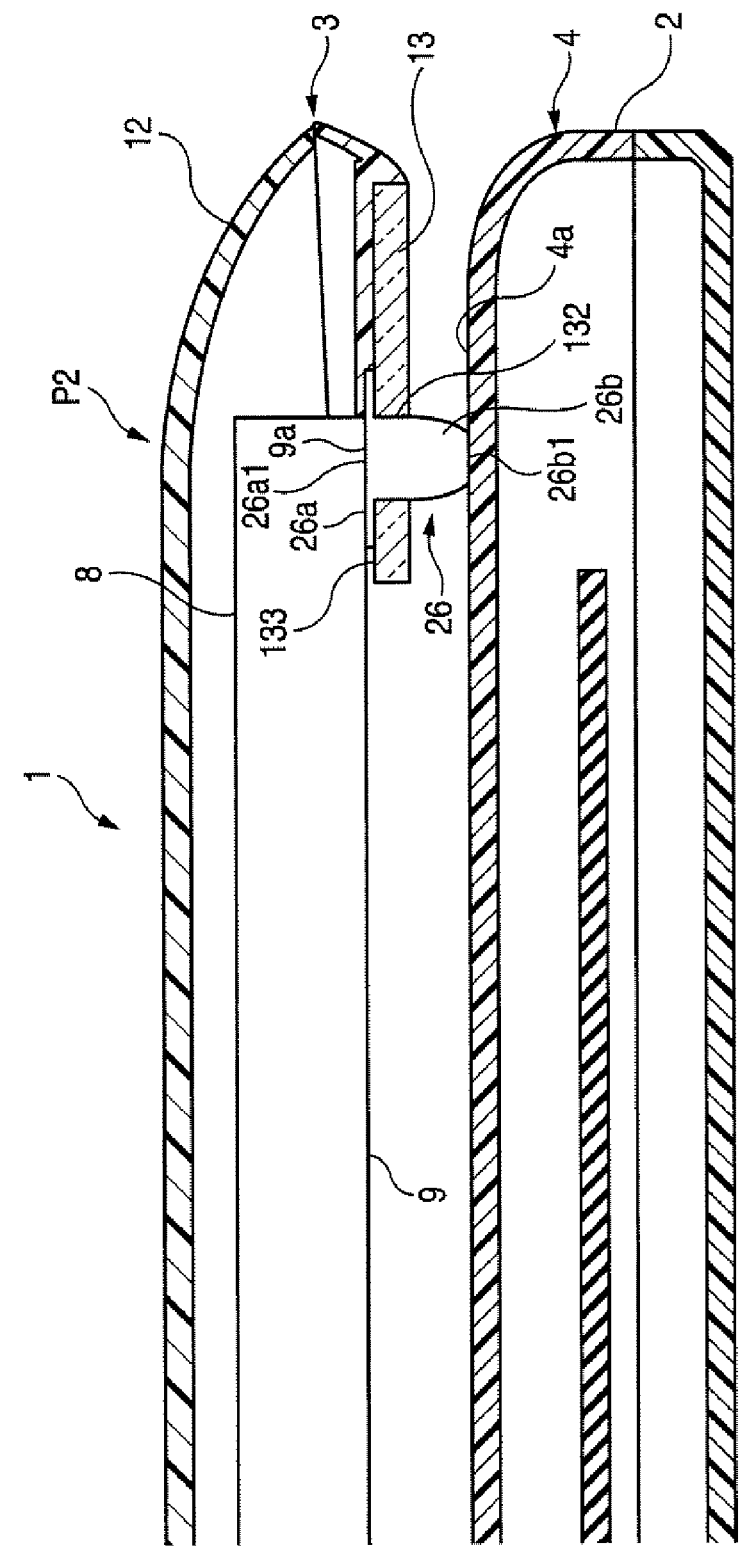
FIG. 7 is an exemplary sectional view of the portable computer cut along the vertical direction in FIG. 1 when the display unit is located in a second position.

As shown in FIG. 1, the portable computer 1 has the body 2, the display unit 3, and hinge mechanisms 21a and 21b provided between the body 2 and the display unit 3. The hinge mechanisms 21a and 21b rotatably support the display unit 3. The display unit 3 is rotatable between a first position P1 where the display unit 3 stands up from the body 2 as shown in FIG. 1 and a second position P2 where the display unit 3 is put on the body 2 so as to be parallel with the body 2 as shown in FIG. 7.

The body 2 has a body housing 4. The body housing 4 is shaped like a box having an upper wall 4a, a circumferential wall 4b, and a lower wall not shown. The body 2 has a circuit board and a plurality of electronic components mounted inside the body housing 4. The upper wall 4a of the body housing 4 supports a keyboard 5.

As shown in FIG. 1, the display unit 3 has a display device housing 7, and a display device 8 contained in the display device housing (housing) 7. The display device housing 7 has a window portion 7a.

Examples of the display device 8 are a liquid crystal display device, plasma display device, an organic electroluminescence display device, a surface-condition electron-emitter display device (SED), etc. The display device 8 has a display screen 9. The display screen 9 is exposed outside the display device housing 7 through the window portion 7a.

Figure 2:
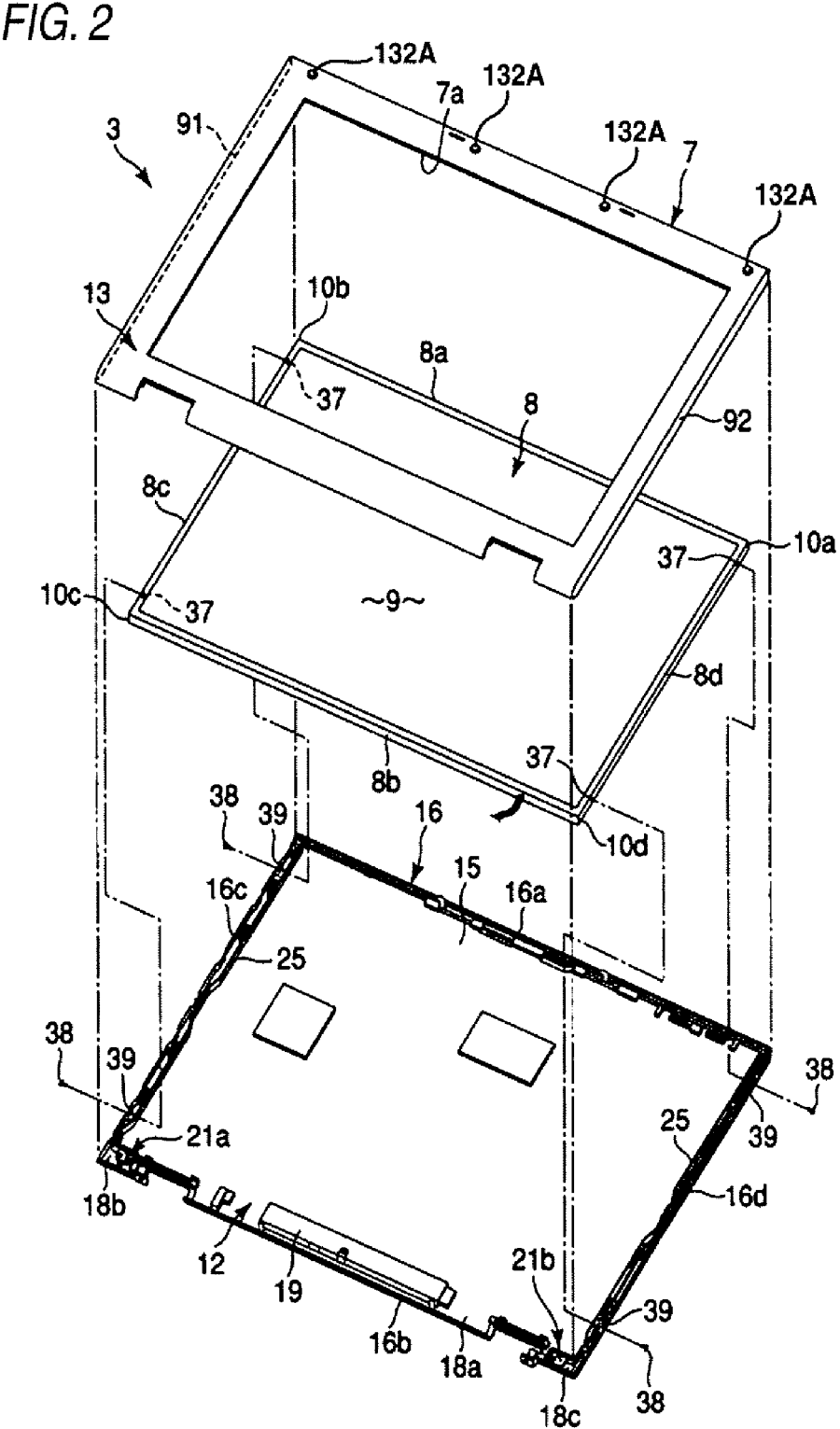
FIG. 2 is an exemplary exploded perspective view of a display unit according to the first embodiment.
Figure 4:
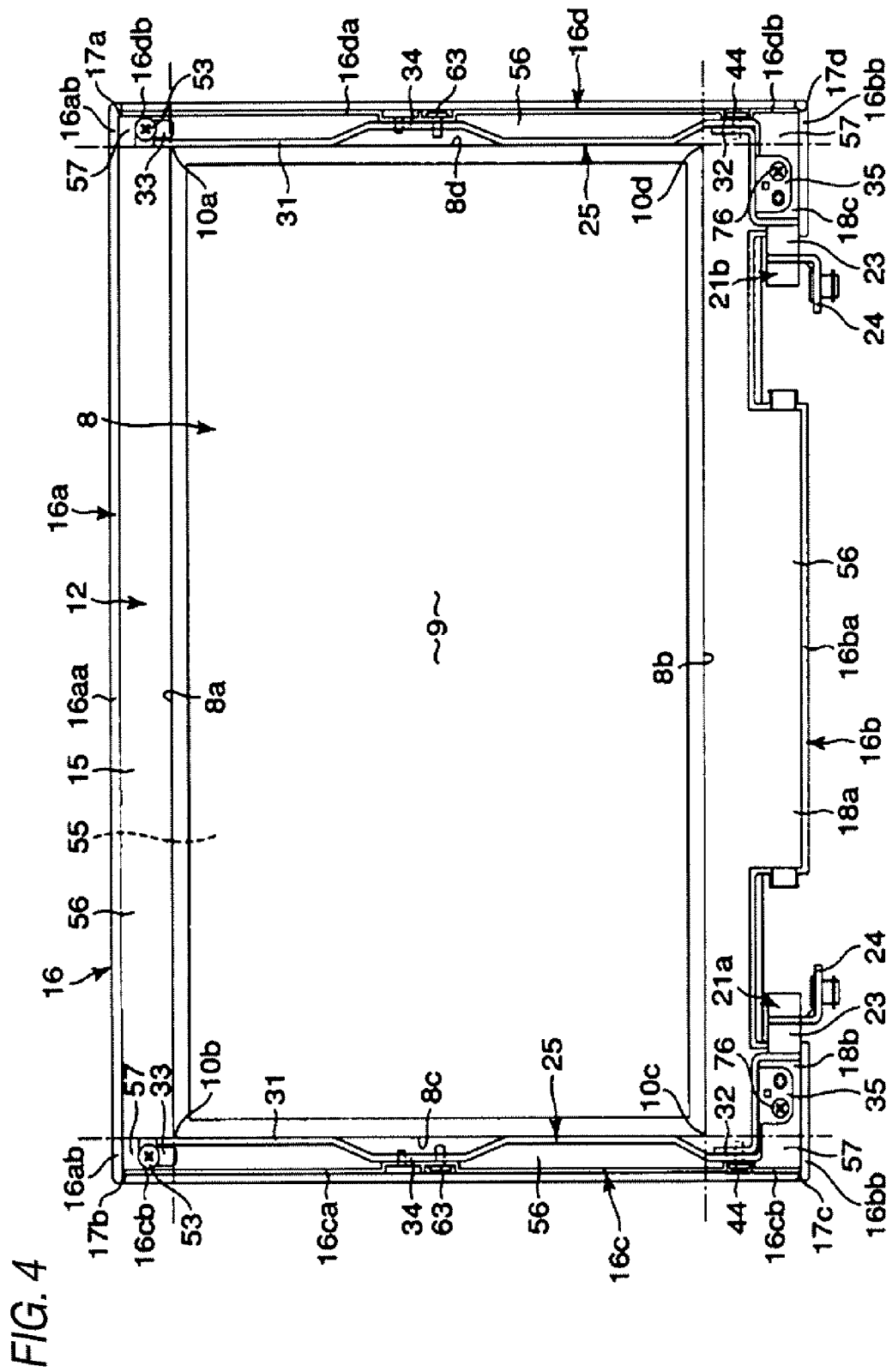
FIG. 4 is an exemplary plan view showing the inside of the display unit according to the first embodiment.

As shown in FIGS. 2 and 4, the display device 8 is shaped like a rectangular plate having four (i.e. first, second, third and fourth) side portions 8a, 8b, 8c and 8d. The first side portion 8a extends in the widthwise direction of the portable computer 1 to form an upper edge of the display device 8 in the condition that the display screen 9 faces the user. The second side portion 8b extends in parallel with the first side portion 8a to form a lower edge of the display device 8. The third and fourth side portions 8c and 8d extend in a direction perpendicular to the first side portion 8a to form left and right edges of the display device 8 respectively.

As shown in FIG. 4, the display device 8 has first, second, third and fourth corner portions 10a, 10b, 10c and 10d formed by the first, second, third and fourth side portions 8a, 8b, 8c and 8d.

As shown in FIG. 2, the display device housing 7 has a cover 12, and a mask 13. The mask 13 and the cover 12 assembled to form the box-shaped display device housing 7. For example, in this embodiment, the mask 13 is made of a magnesium alloy material while the cover 12 is made of a plastic material.

As shown in FIG. 2, the mask 13 is combined with the cover 12. The mask 13 faces the display screen 9 of the display device 8. The window portion 7a is formed in the mask 13. The mask 13 has left and right circumferential walls 91 and 92. When the mask 13 is combined with the cover 12, the left and right circumferential walls 91 and 92 face left and right circumferential walls 16c and 16d of the cover 12 respectively from the outside. The left and right circumferential walls 16c and 16d of the cover 12 are covered with the circumferential walls 91 and 92 of the mask 13 respectively. Notches 39 formed in the cover 12 are hidden under the circumferential walls 91 and 92 of the mask 13.

For example, plural fitting claws (not shown) are provided on inner circumferential surfaces of the left and right circumferential walls 91 and 92 of the mask 13. On the other hand, fitted potions (not shown) corresponding to the fitting claws are provided in the left and right circumferential walls 16c and 16d of the cover 12 so that the fitted portions are fitted to the fitting claws. As a result, the mask 13 is detachably fixed to the cover 12.

The mask 13 has communicating portions 132 which are formed near the window portion 7a and in which a circumferential edge portion 9a of the display screen 9 of the display device 8 is exposed. The mask 13 has a first surface 133 facing the display screen 9 of the display device 8, and a second surface 134 opposite to the first surface 133. The communicating portions 132 make the first and second surfaces 133 and 134 communicate with each other.

In this embodiment, the communicating portions 132 are formed as through-holes 132A provided near the window portion 7a. For example, each through-hole 132A is shaped like a circle.

Figure 5:
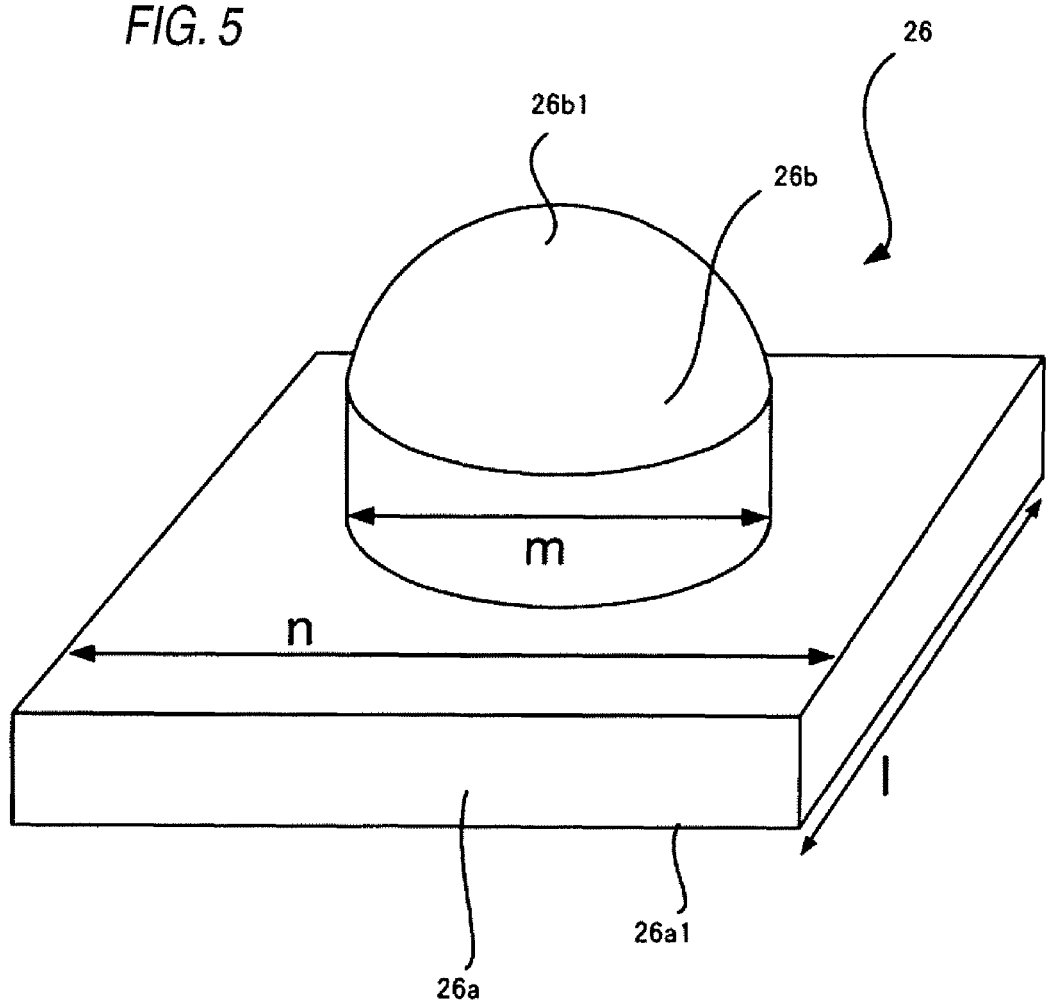
FIG. 5 is an exemplary view showing a filler member according to the first embodiment.

The portable computer 1 according to this embodiment has fillers 26 between the circumferential edge portion 9a of the display screen 9 of the display device 8 and the first surface 133 facing the display screen 9. For example, each filler 26 is made of a silicone resin which is transparent and elastic. Accordingly, each filler 26 has rubber-like elasticity after molding. As shown in FIG. 5, each filler 26 has a body portion 26a packed between the display device 8 and the mask 13, and a protrusive portion 26b integrally protruding from the body portion 26a. The protrusive portion 26b is formed as a protrusion shaped like a rounded arch. The body portion 26a has an abutment surface 26a1 which abuts on the display screen 9. The protrusive portion 26b has an abutment surface 26b1 which abuts on the upper wall 4a of the body housing 4 in the second position P2. The length 1 and width n of the body portion 26a are longer than the diameter m of the protrusive portion 26b. According to this embodiment, the abutment surface 26a1 has a larger area than that of the abutment surface 26b1 to thereby make it possible to hold the display device 8 stably.

As described above, the portable computer 1 according to this embodiment has: a display device (display device 8) provided with a display screen (display screen 9); a housing (display device housing 7) which contains the display device and which has a first opening portion (window portion 7a) facing the display screen, and second opening portions (communicating portions 132) facing a circumferential edge portion of the display screen; a support portion (body housing 4) which rotatably supports the housing between a position (first position P1) where the display screen is exposed and a position (second position P2) where the display screen is hidden; and elastic members (fillers 26) which are packed between the circumferential edge portion of the display screen and the housing and which protrude from the second opening portions so as to abut on the support portion located when the housing is in the position where the display screen is hidden.

In this embodiment, the fillers 26 are provided on an upper portion of the display device housing 7 opposite to the hinge mechanisms 21a and 21b with respect to the display screen 9. According to this configuration, a shock applied on a large-torque-generated region where far from the hinge mechanisms 21a and 21b (center of rotation) can be appropriately treated.

In this embodiment, the fillers 26 are formed symmetrically over the circumferential edge portion 9a of the display screen 9, so that stress imposed on respective regions can be distributed equally.

FIG. 4 is an exemplary view showing the relationship between the cover 12 and the display device 8. The cover 12 has a back wall 15, and a circumferential wall 16. The back wall 15 is located behind the display device 8 and faces the rear surface of the display device 8 (i.e. the surface opposite to the display screen 9). The back wall 15 is formed so as to be larger than the outer size of the display device 8.

The circumferential wall 16 stands up from the circumferential edge portion of the back wall 15 and surrounds the side portions 8a, 8b, 8c and 8d of the display device 8. Specifically, the circumferential wall 16 has an upper circumferential wall 16a, a lower circumferential wall 16b, a left circumferential wall 16c, and a right circumferential wall 16d. The upper and lower circumferential walls 16a and 16b extend in parallel with each other along the widthwise direction of the portable computer 1. The left and right circumferential walls 16c and 16d extend along a direction perpendicular to the upper circumferential wall 16a. The left and right circumferential walls 16c and 16d may be positioned slightly inside the cover 12 as compared with the outer edge of the back wall 15. As shown in FIG. 4, the cover 12 has first, second, third and fourth corner portions 17a, 17b, 17c and 17d formed by the circumferential walls 16a, 16b, 16c and 16d.

The upper circumferential wall 16a of the cover 12 has a first wall portion 16aa formed in a central portion of the upper circumferential wall 16a so as to face the first side portion 8a of the display device 8, and second wall portions 16ab formed in left and right end portions of the upper circumferential wall 16a so as not to face the display device 8. The lower circumferential wall 16b of the cover 12 has a first wall portion 16ba formed in a central portion of the lower circumferential wall 16b so as to face the second side portion 8b of the display device 8, and second wall portions 16bb formed in left and right end portions of the lower circumferential wall 16b so as not to face the display device 8.

The left circumferential wall 16c of the cover 12 has a first wall portion 16ca formed in a central portion of the left circumferential wall 16c so as to face the third side portion 8c of the display device 8, and second wall portions 16cb formed in upper and lower end portions of the left circumferential wall 16c so as not to face the display device 8. The right circumferential wall 16d of the cover 12 has a first wall portion 16da formed in a central portion of the right circumferential wall 16d so as to face the fourth side portion 8d of the display device 8, and second wall portions 16db formed in upper and lower end portions of the right circumferential wall 16d so as not to face the display device 8.

First, second and third protrusive portions 18a, 18b and 18c are provided on a lower end portion of the cover 12. On the lower end portion of the cover 12, the first protrusive portion 18a outwardly protrudes from the central portion, and the second and third protrusive portions 18b and 18c outwardly protrudes from the left and right portions respectively. An electronic component 19 such as an inverter is put in the first protrusive portion 18a.

As shown in FIG. 1, the portable computer 1 has a pair of hinge mechanisms 21a and 21b which connect the display device housing 7 to the body housing 4 so that the display device housing 7 is rotatable relative to the body housing 4.

Figure 3:
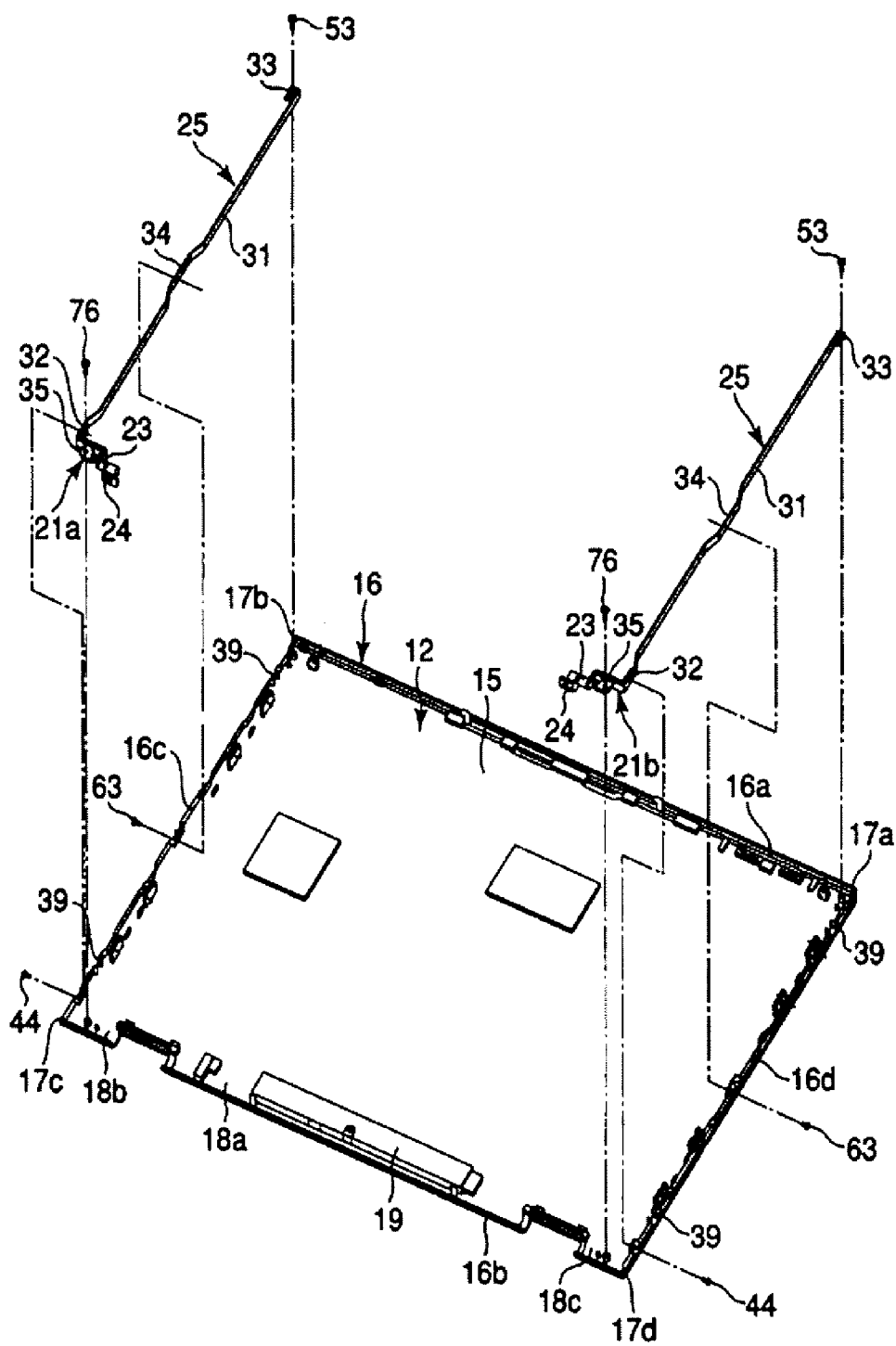
FIG. 3 is an exemplary perspective view of a cover and brackets according to the first embodiment.

As shown in FIG. 3, each hinge mechanisms 21a and 21b has a hinge shift 23, a first bracket 24, and a second bracket 25. The hinge shaft 23 is provided between the display device housing 7 and the body housing 4. The first bracket 24 has one end portion connected to the hinge shaft 23, and the other end portion fixed to the body housing 4. The second bracket 25 has one end portion connected to the hinge shaft 23, and the other end portion extending into the display device housing 7 and fixed to the display device housing 7.

The first and second brackets 24 and 25 is rotatable relative to each other through the hinge shaft 23. The bracket 25 is fixed to the display device 8 by a screw 38. Specifically, the screw 38 is inserted in a screw insertion hole of the bracket 25 and engaged with a screw hole 37 of the display device 8 so that the bracket 25 is fixed to the display device 8. The screw 38 is attached to the screw insertion hole and the screw hole 37 along a direction perpendicular to the fourth side portion 8d of the display device 8.

Screw hole portions 32 to 35 are provided on an extending member 31 of each hinge mechanisms 21a and 21b. The screw hole portions 32 to 35 are engaged with the screw hole portions correspondingly provided on the cover by screwed 44, 53, 63 and 76, respectively.

As shown in FIG. 4, a region in the cover 12 is classified into first, second and third regions 55, 56 and 57. The first region 55 is located in the back of the display device 8 and faces the rear surface of the display device 8. The second regions 56 are formed respectively between the first wall portion 16aa of the upper circumferential wall 16a and the first side portion 8a of the display device 8, between the first wall portion 16ba of the lower circumferential wall 16b and the second side portion 8b of the display device 8, between the first wall portion 16ca of the left circumferential wall 16c and the third side portion 8c of the display device 8 and between the first wall portion 16da of the right circumferential wall 16d and the fourth side portion 8d of the display device 8. The third regions 57 are formed in a circumferential edge portion of the display device housing 7 except the first and second regions 55 and 56. That is, the third region 57 is a region defined by any adjacent two of the second wall portions 16ab, 16bb, 16cb and 16db of the circumferential walls 16a, 16b, 16c and 16d. In other words, the third regions 57 are formed between the corner portions 10a, 10b, 10c and 10d of the display device 8 and the corner portions 17a, 17b, 17c and 17d of the cover 12. The third regions 57 contain not only part of the back wall 15 of the cover 12 but also part of inner circumferential surfaces of the respective circumferential walls 16a, 16b, 16c and 16d.

Figure 6:
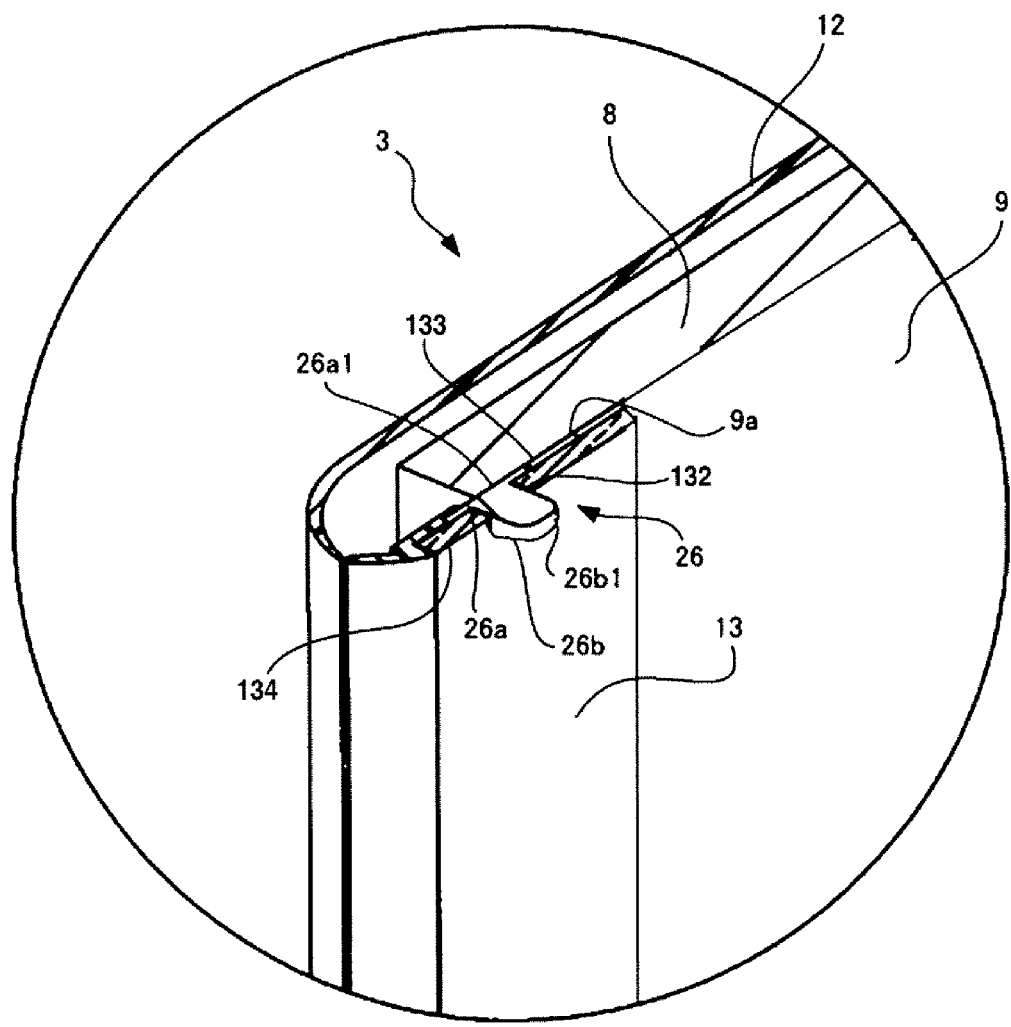
FIG. 6 is an exemplary perspective view of the display unit cut along the line F5-F5 in FIG. 1.

A stress relaxing function in the portable computer 1 according to this embodiment will be described below with reference to FIGS. 6 and 7.

As described above, the portable computer 1 according to this embodiment is configured so that, protrusive portions 26b protruding from the mask 13. As shown in FIGS. 6 and 7, each protrusive portion 26b extends from the body portion 26a and outwardly protrudes through the communicating portion 132. For example, a silicone resin is preferably used as the material of the filler 26, and a material equivalent to the silicone resin may be used.

The body portion 26a of the filler 26 is packed in a gap between the display device 8 and the mask 13 so that air does not remain in the gap. The body portion 26a, between the display device 8 and the mask 13, absorbs shock to be applied onto the display device 8. The body portion 26a holds the display device 8 so that the display device 8 and the mask 13 do not interfere.

In the portable computer 1, when the display unit 3 moves from the first position P1 shown in FIG. 1 to the second position P2 shown in FIG. 7, the protrusive portion 26b of each filler 26 abuts on the upper wall 4a of the body 2. As a result, the protrusive portion 26b absorbs shock to prevent the display unit 3 from violently colliding with the upper wall 4a of the body 2. On this occasion, stress caused by the shock is distributively let out to the body portion 26a of the filler 26, so that there is no stress concentration in the display device 8.

According to the first embodiment, the portable computer 1 has a body 2, and a display unit 3 which is rotatable between a first position P1 where the display unit 3 stands up from the body 2 and a second position P2 where the display unit 3 is put on the body 2. The display unit 3 has a display device 8, a mask 13, and fillers 26. The mask 13 covers a front surface of the display device 8 and has a first surface 133 facing the display device 8, a second surface 134 opposite to the first surface, and communicating portions 132 communicating the first surface 133 and a second surface 134 with each other. Each of the resin fillers 26 has a body portion 26a packed in a gap between the display device 8 and the mask 13, and a protrusive portion 26b which extends integrally from the body portion 26a and outwardly protrudes through the communicating portion 132 so as to abut on the body 2 when the display unit 3 is brought in the second position P2.

According to the aforementioned configuration, shock generated in the display unit 3 can be absorbed to the fillers 26 when the display unit 3 is moved from the first position P1 to the second position P2. On this occasion, stress generated in the protrusive portions 26b because of collision with the body 2 is distributed to the body portions 26a through the communicating portions 132, so that there is no stress concentration in the display device 8 around the protrusive portions 26b. As a result, the display device 8 can be prevented from being cracked. Each filler 26 is molded so that the protrusive portion 26b is integrated with the body portion 26a, and for example, there is no need to align and stick the sticking-type protrusive portions on the display device 8 to be aligned. Therefore, it is possible to produce the display unit 3 easily.

The communicating portions 132 are through-holes 132A provided in the mask 13. According to this configuration, the communicating portions 132 can be formed in a simple structure. Each filler 26 is made of a silicone resin. According to this material, each filler 26 filling a gap between the display device 8 and the mask 13 and having a protrusive portion 26b to be abut on the body 2 can be provided easily.

Figure 8:
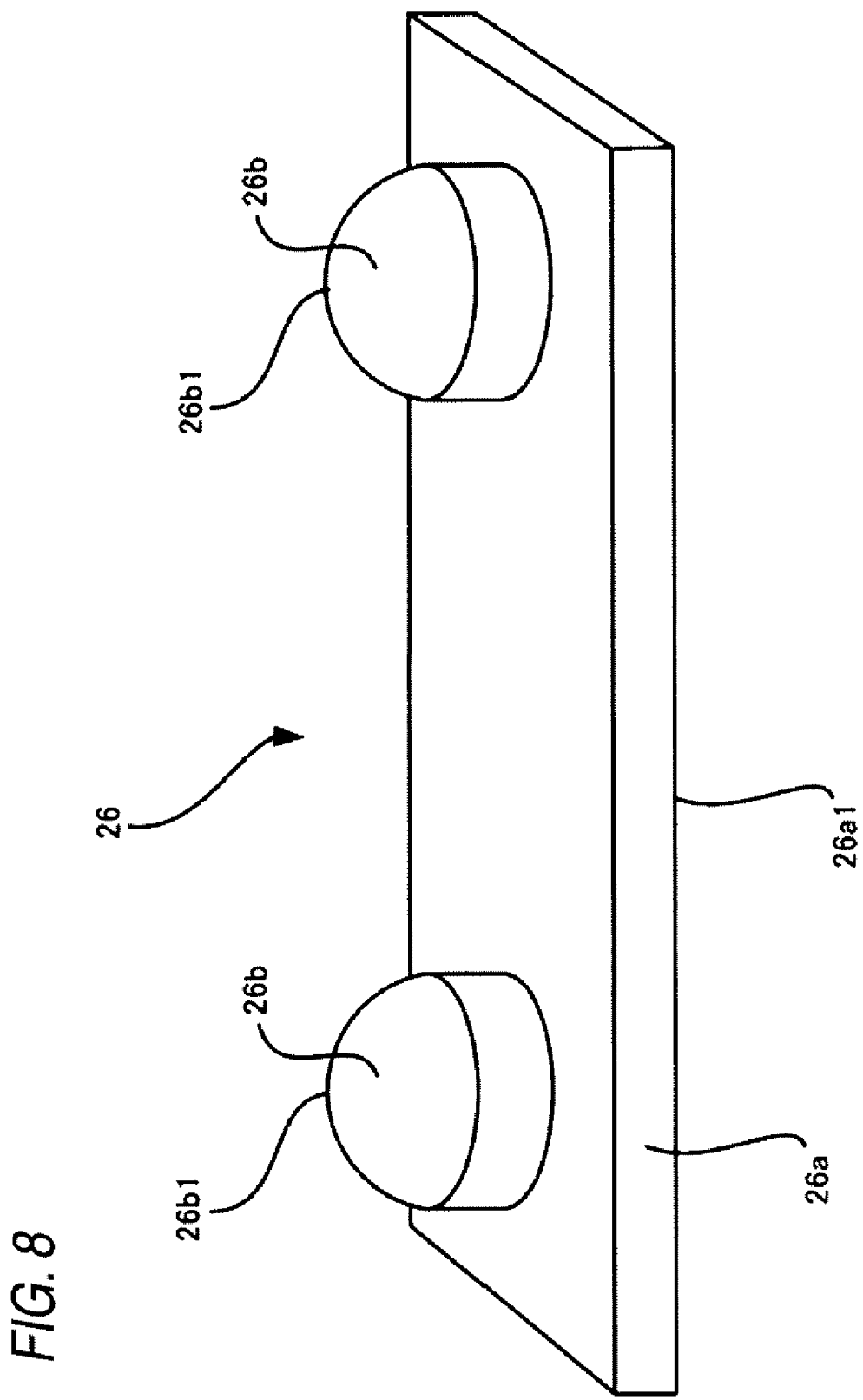
FIG. 8 is an exemplary view showing a filler member according to a second embodiment of the invention.
Figure 9:
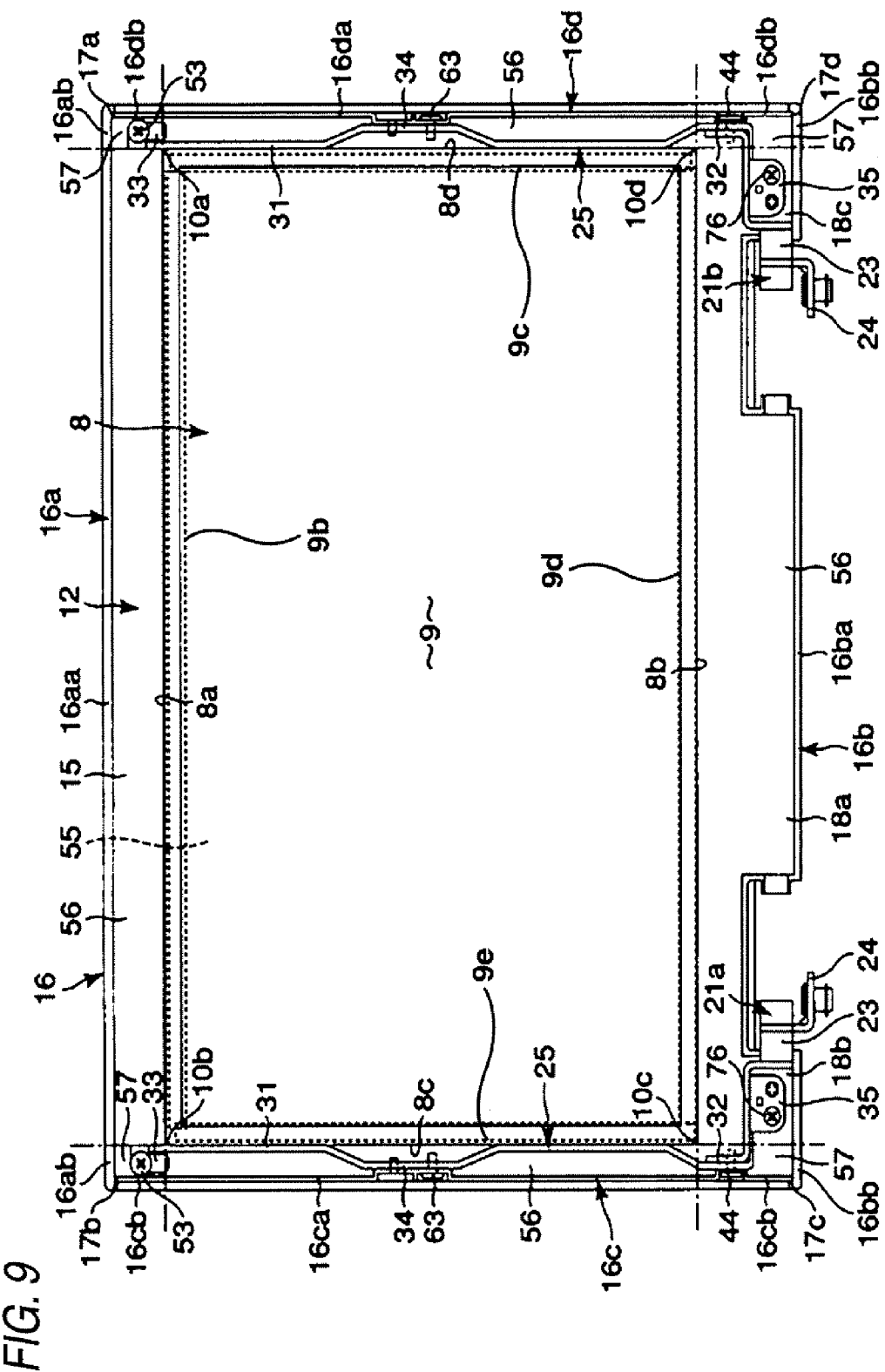
FIG. 9 is an exemplary plan view showing the inside of a display unit in a portable computer according to the second embodiment.

A portable computer according to a second embodiment of the invention will be described below with reference to FIGS. 8 and 9. The second embodiment is substantially the same as the first embodiment except the shape of each filler 26. The point of difference will be described mainly while like numerals refer to like parts for the sake of omission of duplicated description.

The portable computer 1 according to the second embodiment has substantially the same external appearance as that shown in FIG. 1. The display unit 3 is rotatable between the first position P1 shown in FIG. 1 and the second position P2 shown in FIG. 7.

On the circumferential edge portion 9a of the display screen 9 of the display device 8, a circumferential edge upper region 9b, circumferential edge side regions 9c and 9d and circumferential edge lower region 9e are defined. As shown in FIGS. 8 and 9, in the second embodiment, the filler 26 has a body portion 26a provided along the circumferential edge upper region 9b of the display screen 9, and protrusive portions 26b extending from the body portion 26a and protruding from through-holes 132A facing the circumferential edge upper region 9b. According to this configuration, shock generated in the display unit 3 can be absorbed to the filler 26 in the same manner as in the first embodiment when the display unit 3 is moved from the first position P1 to the second position P2. On this occasion, stress generated in the protrusive portions 26b because of collision with the body 2 is distributed by the body portion 26a provided in the circumferential edge upper region 9b of the display screen 9. As a result, stress imposed on the display device 8 can be suppressed more intensively than the configuration of the first embodiment. In the second embodiment, the filler member 26 is provided along the circumferential edge upper region 9b of the display screen 9. However, the filler member 26 may be provided along circumferential edge side and lower regions 9c, 9d and 9e of the display screen 9.

A portable computer according to a third embodiment of the invention will be described below with reference to FIGS. 10 and 11. The third embodiment is substantially the same as the foregoing embodiments except the shapes of the filler 26 and the cover 12. The point of difference will be described mainly while like numerals refer to like parts for the sake of omission of duplicated description.

The portable computer 1 according to the third embodiment has substantially the same external appearance as that shown in FIG. 1. The display unit 3 is rotatable between the first position P1 shown in FIG. 1 and the second position P2 shown in FIG. 7.

Figure 10:
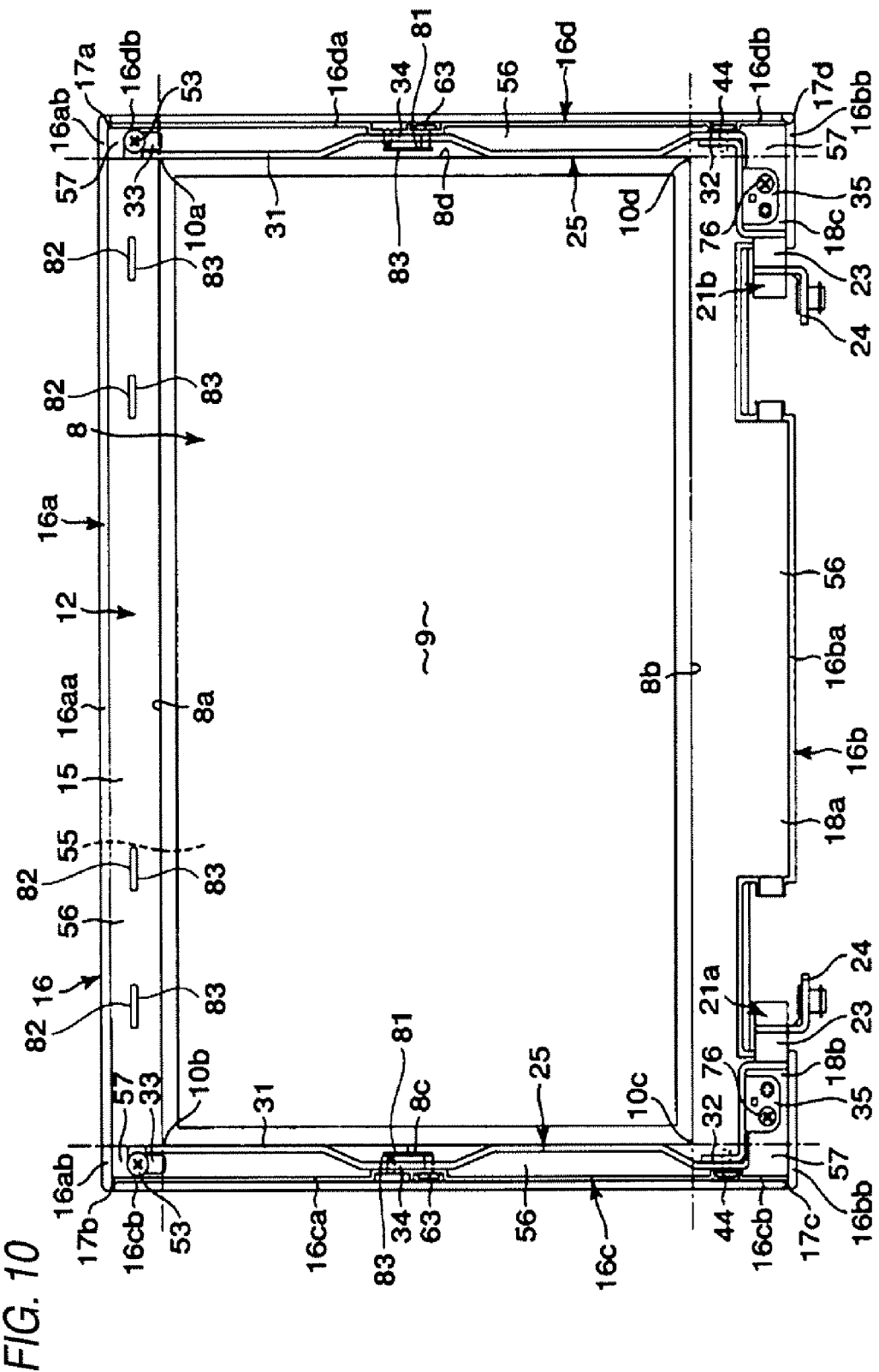
FIG. 10 is an exemplary plan view showing the inside of a display unit in a portable computer according to a third embodiment of the invention.

As shown in FIG. 10, in the third embodiment, a plurality of first ribs 81 and a plurality of second ribs 82 are formed so as to stand up from the back wall 15 of the cover 12. The first ribs 81 are formed between the third and fourth side portions 8c and 8d of the display device 8 and the left and right circumferential walls 16c and 16d of the cover 12. The second ribs 82 are formed between the first side portion 8a of the display device 8 and the upper circumferential wall 16a of the cover 12. The first and second ribs 81 and 82 have surfaces 83 facing the side portions 8a, 8c and 8d of the display device 8.

Figure 11:
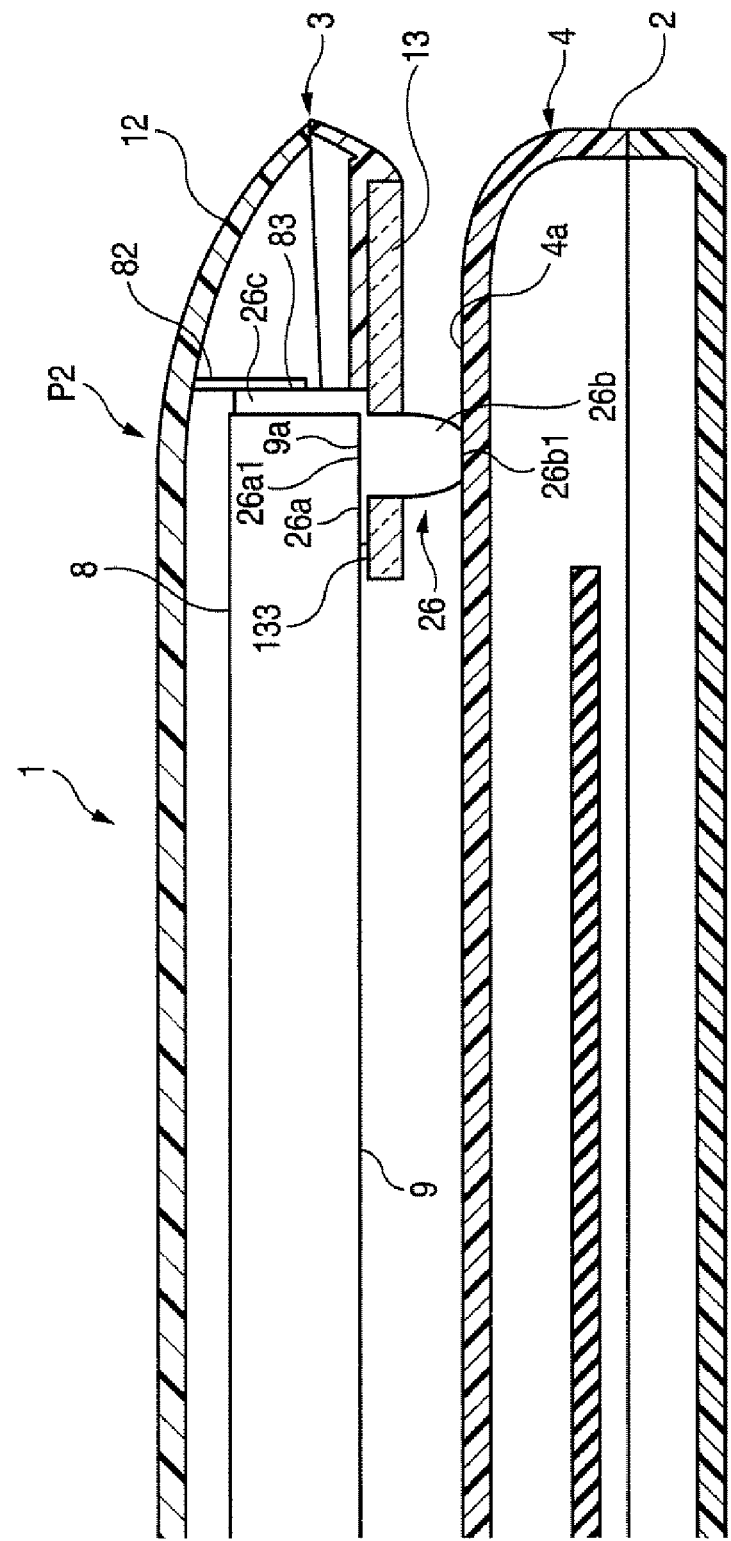
FIG. 11 is an exemplary perspective view of the display unit cut along the horizontal direction in the portable computer according to the third embodiment.

As shown in FIG. 11, each filler 26 has an extension portion 26c extending between the corresponding first/second rib 81/82 and the display device 8. That is, in this embodiment, fillers 26 packed between the display device 8 and the mask 13 are provided along the outer edge of the display device 8, and the fillers 26 can hold the display device 8 from sides thereof to prevent the display device 8 from sliding laterally and vertically. According to this configuration, shock generated in the sides of the display unit 3 can be absorbed and distributed to the extension portions 26c of the fillers 26, and therefore, there is no stress concentration in the sides of the display device 8 around the extension portions 26c. As a result, the sides of the display device 8 can be prevented from being cracked. In this embodiment, the ribs 81 and 82 standing up from the back wall 15 of the cover 12 are partially formed. However, the ribs 81 and 82 may be formed so as to surround sides of the display device 8, and the extension portions 26c may be provided along the whole sides accordingly. With this configuration, stress can be distributed more efficiently.

Next, a portable computer according to a fourth embodiment of the invention will be described with reference to FIG. 12. The fourth embodiment is substantially the same as the foregoing embodiments except the shape of the filler 26. The point of difference will be described mainly while like numerals refer to like parts for the sake of omission of duplicated description.

The portable computer 1 according to the fourth embodiment has substantially the same external appearance as that shown in FIG. 1. The display unit 3 is rotatable between the first position P1 shown in FIG. 1 and the second position 22 shown in FIG. 7.

Figure 12:
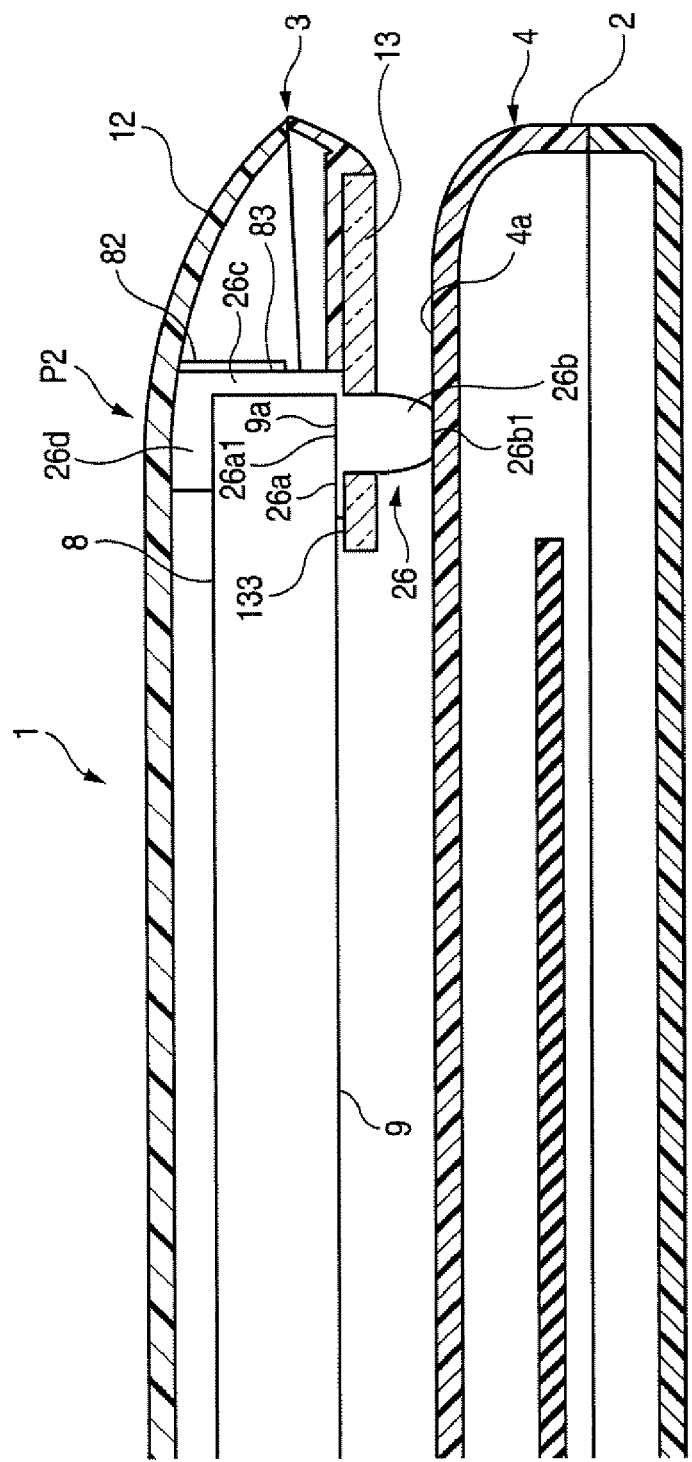
FIG. 12 is an exemplary perspective view of a display unit cut along the horizontal direction in a portable computer according to a fourth embodiment of the invention.

As shown in FIG. 12, in the fourth embodiment, each filler 26 has an extension portion 26d extending between the back wall 15 of the cover 12 and the display device 8. That is, in this embodiment, the fillers 26 are provided along the rear surface of the display device 8 and hold the display device 8 so as not to interfere with the cover 12. According to this configuration, shock generated in the cover 12 can be absorbed to the extension portions 26d of the fillers 26, while shock generated in the display unit 3 when the display unit 3 is moved from the first position 21 to the second position 22 can be absorbed. Because stress caused by shock from the cover 12 side on this occasion or stress generated in the protrusive portions 26b because of collision with the body is distributed to the body portion 26a and the extension portions 26d through the communicating portions 132, there is no stress concentration in the display device 8 around the protrusive portions 26b. As a result, the display device 8 can be prevented from being cracked. In the fourth embodiment, the display device 8 can be held from opposite surfaces, and stress from the cover 12 side can be relaxed.

The invention is not limited to the aforementioned embodiments per se and constituent members may be modified to embody the invention in practical use without departing from the scope and spirit of the invention. Constituent members disclosed in the embodiments may be combined suitably to form various inventions. For example, several constituent members may be removed from all the constituent members described in each of the embodiments. In addition, constituent members in different embodiments may be combined suitably.

In the aforementioned embodiments, the portable computer 1 is exemplified as an electronic apparatus. However, the invention can be applied to any other electronic apparatus such as a cellular phone.

According to an aspect of the present invention, there is provided an electronic apparatus in which stress imposed on the display device can be suppressed.

What is claimed is:

1. An electronic apparatus comprising:
a display device including a display screen;
a housing that accommodates the display device and that includes a first opening portion facing a central portion of the display screen and a second opening portion facing a circumferential edge portion of the display screen;
a support portion that supports the housing so as to be rotatable between an opened position where the display screen is exposed and a closed position where the display screen is hidden; and
an elastic member that abuts the display screen within the housing, a part of the elastic member protruding from the housing through the second opening portion so as to abut on the support portion when the housing is in the closed position.

2. An electronic apparatus comprising:
a first housing on which an input portion configured to receive an input is provided;
a second housing that accommodates a display device and has an opening portion formed therein;
a connection portion connecting the first housing and the second housing so that the second housing is rotatable between an opened position where the input portion is exposed and a closed position where the input portion is hidden; and
an elastic member that abuts the display screen within the second housing, a part of the elastic member protruding from the second housing through the opening portion so as to abut on the first housing when the second housing is in the closed position.

3. The electronic apparatus of claim 2,
wherein the elastic member includes:
a protrusive portion having a first abutment surface that abuts on the first housing; and
a body portion having a second abutment surface that is wider than the first abutment surface and that abuts on the display device.

4. The electronic apparatus of claim 2,
wherein the protrusive portion has a cylindrical shape,
wherein the body portion has a third abutment surface that abuts an inner surface of the housing, and
wherein a width of the body portion is wider than a diameter of the protrusive portion.

5. The electronic apparatus of claim 4,
wherein the elastic member is accommodated within the second housing while extending along an outer edge of the display device.

6. The electronic apparatus of claim 5,
wherein the second housing has a rib formed to face a side portion of the display device, and
wherein the elastic member further includes a extension portion that is provided between the side portion of the display device and the rib.

7. An electronic apparatus comprising:
a first housing on which an input portion configured to receive an input is provided;
a second housing that accommodates a display device and has an opening portion formed therein;
a connection portion connecting the first housing and the second housing so that the second housing is rotatable between an opened position where the input portion is exposed and a closed position where the input portion is hidden; and 8. The electronic apparatus of Claim 7, wherein the abutment portion includes:
a protrusive portion having a first abutment surface that abuts on the first housing;
and a body portion having a second abutment surface that is wider than the first abutment surface and that abuts on the display device.

9. The electronic apparatus of Claim 8,
wherein the protrusive portion has a cylindrical shape,
wherein the body portion has a third abutment surface that abuts an inner surface of the second housing, and
wherein a width of the body portion is wider than a diameter of the protrusive portion.

10. The electronic apparatus of Claim 9,
wherein the second housing has a rib formed to face a side portion of the display device, and
wherein the abutment portion further includes a extension portion that is provided between the side portion of the display device and the rib.

* * * * *